T. N. DAVEY.
Hoisting-Machine.
No. 215,102.                    Patented May 6, 1879.
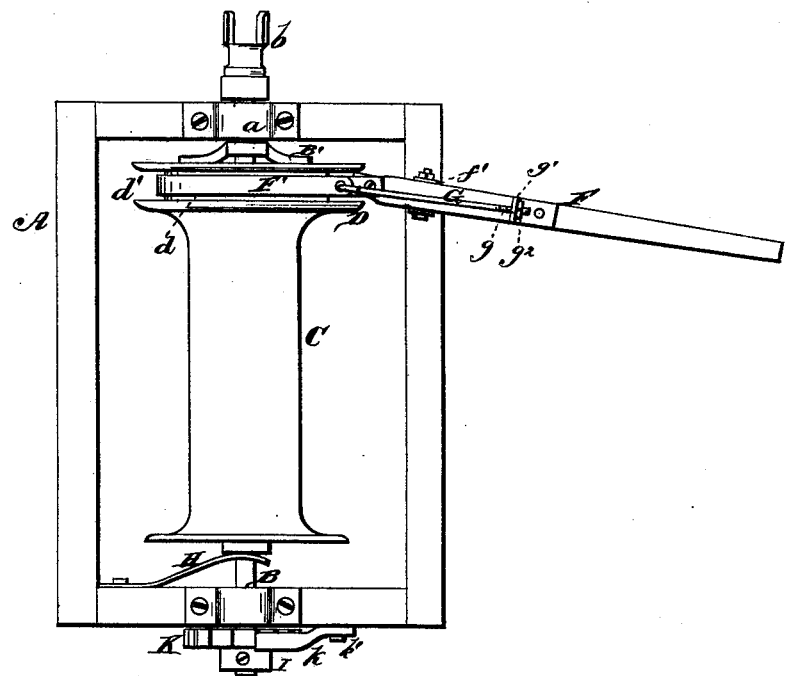
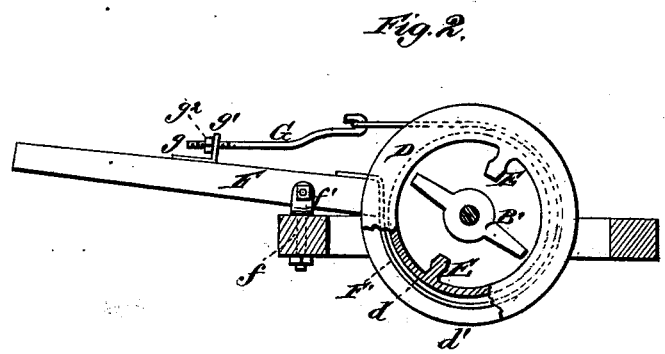
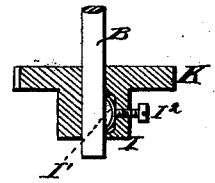
WITNESSES                                       INVENTOR
                                          Thomas N. Davey.
                          By  Gilmore, Smith & Co.
                                             ATTORNEYS.

UNITED STATES PATENT OFFICE.

THOMAS N. DAVEY, OF CARTHAGE, MISSOURI.

IMPROVEMENT IN HOISTING-MACHINES.

Specification forming part of Letters Patent No. 215,102, dated May 6, 1879; application filed March 22, 1879.

*To all whom it may concern:*

Be it known that I, THOS. N. DAVEY, of Carthage, in the county of Jasper and State of Missouri, have invented a new and valuable Improvement in Hoisting-Machines; and I do hereby declare that the following is a full, clear, and exact description of the construction and operation of the same, reference being had to the annexed drawings, making a part of this specification, and to the letters and figures of reference marked thereon.

Figure 1 of the drawings is a top view of my hoisting-machine. Fig. 2 is an end view, partly in section. Fig. 3 is a view in detail, showing friction-spring.

My invention relates to a hoisting mechanism, especially adapted to what is known as "shallow" mining; and the novelty consists in the construction and arrangement of parts, as will be more fully hereinafter set forth.

In carrying out my invention I journal in a suitable frame a power-shaft, with pulley, toggle, or other motor connection, and provided with a clutch, which engages with a similar clutch on spool or windlass loose upon the shaft, as shown. Formed upon, secured to, or made in one with the spool is a brake-drum.

Upon the frame is pivoted a brake-lever, to the fulcrum end of which is secured a brake-band, which, surrounding the brake-drum, is connected by a screw-link to the handle of the brake-lever above the fulcrum.

A spring upon the frame bears against the end of the spool opposite the clutches, and exerts a constant force to keep the spool in gear with the power-clutch, the force of the spring being readily resisted, and the clutches disconnected by the brake-lever, as shown.

Rigid with the shaft is a hub carrying a ratchet-wheel, governed by an ordinary pawl on the frame. Within this hub, and bearing upon the shaft, is a spring, governed by a set-screw, which adjusts the friction.

These parts are formed of any desirable material or form which will suit the purpose described.

Referring to the drawings, A represents the frame, in which is journaled, at $a$, the power-shaft B, carrying power-clutch B' and motor-connection $b$. C represents the spool or windlass upon which the rope is wound, having brake-drum D, with brake-bearing surface $d$ and guide-flanges $d'$, and clutches E, which engage with the power-clutch B'.

Pivoted at $f$ is the fulcrum-joint $f'$ of the brake-lever F, to the fulcrum end of which is secured brake-band F', which, passing around the drum, is attached to a link, G, having a threaded end, $g$, which, passing through a proper perforated lug, $g^1$, on the lever above the fulcrum, is governed by a threaded burr, $g^2$, as shown.

H represents a safety-spring, pivoted to the frame at $h$, and bearing with a constant force against the spool to keep it in gear with the power. I represents a hub or sleeve, rigid with which is a ratchet-wheel, K, governed by pawl $k$, pivoted to the frame at $k'$.

In a recess in the hub I is a spring, I$^1$, which bears upon the shaft B, and is governed by a set or thumb screw, I$^2$, by which the friction may be adjusted.

In hoisting, the power being applied and the clutches engaged, the spool revolves and winds up the rope. In lowering, the operator forces the brake-lever horizontally to disengage the clutch, and depresses the lever to tighten the brake-band, which enables him to stop the bucket at any point, or to lower at any speed.

If from carelessness of the operator or inoperativeness or disability the brake mechanism should fail to act, the safety-spring H instantly forces the spool into clutch-connection with the shaft B, and to revolve the same slowly under the pressure of the set-screw I$^2$ and the friction of the spring I$^1$.

I claim—

1. The ratchet K $k$, hub I, spring I$^1$, and adjusting-screw I$^2$, combined with the shaft B, as and for the purpose set forth.

2. The shaft B, carrying loose spool and drum, and clutches B' E, combined with safety-spring H and friction-spring I$^1$, as set forth.

3. The brake F $f'$ F', adjustable by threaded link G $g^2$, combined with power-connections B' E and safety-spring H, as set forth.

4. The combined shifter and brake, composed, as shown, of the lever F $f$ $f'$, band F', and link G $g^2$, adapted to serve, as described.

In testimony that I claim the above I have hereunto subscribed my name in the presence of two witnesses.

THOMAS NICHOLAS DAVEY.

Witnesses:
 J. L. MOORE,
 WM. MCMILLAN.